United States Patent
Cheng et al.

(10) Patent No.: US 6,353,602 B1
(45) Date of Patent: Mar. 5, 2002

(54) CDMA BASE STATION ASSISTED SOFT HANDOFF

(75) Inventors: Terry Si-Fong Cheng; Ching Yao Huang, both of Randolph/Morris, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/131,390

(22) Filed: Aug. 7, 1998

(51) Int. Cl.[7] .................................................. H04Q 7/34
(52) U.S. Cl. ...................... 370/332; 370/335; 455/437; 455/442
(58) Field of Search ................................ 370/331, 332, 370/335, 342; 455/437, 442

(56) References Cited

U.S. PATENT DOCUMENTS

| | | | | |
|---|---|---|---|---|
| 5,987,326 A | * | 11/1999 | Tiedemann, Jr. et al. | ... 455/442 |
| 6,038,448 A | * | 3/2000 | Chheda et al. | ............... 455/436 |
| 6,088,335 A | * | 7/2000 | I et al. | ......................... 370/252 |
| 6,151,502 A | * | 11/2000 | Padovani et al. | ........... 455/442 |

\* cited by examiner

Primary Examiner—Melvin Marcelo

(57) ABSTRACT

A code-division multiple access base station assisted quality soft handoff algorithm screens or filters out candidate pilot signals from a pilot strength measurement message generated by a mobile station and provides the revised pilot strength measurement message to the mobile switching center of the mobile communication system. The mobile switching center subsequently conducts handoff processing in accordance with the revised pilot strength measurement message. If the combined pilot signal strength of the existing mobile station active legs is less than a first threshold, the current pilot strength measurement message is maintained. If the combined pilot signal strength of the existing mobile station active legs is greater than or equal to the first threshold, all candidate pilot signals are deleted from the pilot strength measurement message such that only pilot signals of existing mobile station active legs remain. Also, if the pilot signal strength of a candidate pilot signal is greater than a second threshold, the candidate pilot signal is added to the pilot strength measurement message. The number of handoffs per call are reduced using the revised pilot strength measurement message such that forward link power and network processing resources are conserved.

29 Claims, 5 Drawing Sheets

CDMA BASE STATION ASSISTED SOFT HANDOFF

FIELD OF THE INVENTION

1. Technical Field

The present invention relates to a CDMA base station handoff technique for reducing excessive handoffs in a mobile communication system in order to conserve forward link power and network processing resources.

2. Description of the Background Art

In conventional code division multiple access (CDMA) mobile communication systems, there may be an excessive number of handoffs per call as the mobile station moves, especially if the mobile station is located in a fading environment. Excessive handoffs of ten or greater may occur during a call, adversely impacting the forward link power and network processing resources.

IS-95 is a mobile to base station compatibility standard for dual-mode wide band spread spectrum. IS-95 is a direct-sequence CDMA scheme where users are differentiated on the basis of unique pseudorandom codes. Each signal consists of a different pseudorandom binary sequence that modulates the carrier and spreads the spectrum of the waveform.

According to version IS-95-A, upon initiating an originating call, a mobile station accesses a previously stored updated neighbor list of sectors, scans pilot signals transmitted from base stations on the neighbor list to determine pilot signal strength and locks onto a first strongest pilot signal. The mobile station then transmits a call initiation request to the base station which transmitted the pilot signal that the mobile station locked onto and the call is then set up on the respective traffic channel corresponding to the locked-on pilot signal. The traffic channel corresponding to this strongest pilot signal is designated as an active leg of the mobile station.

After the call is set up, the mobile station continues to scan the pilot signals of the neighbor list and determines pilot signal strength of all received pilot signals. The mobile station then generates a pilot strength measurement message (PSMM) which initially includes identification of the pilot signal first locked onto and the pilot signal strength of the pilot signal. Received pilot signals having pilot signal strength greater than predetermined threshold T_add are added to the PSMM as candidate pilot signals. T_add typically may be within the range of −12 dB to −14 dB. The mobile station transmits the PSMM to the corresponding base station of the existing mobile station active leg.

The base station sends the received PSMM to the mobile switching center which controls handoffs of mobile station active legs. If the PSMM includes only one existing mobile station active leg and plural candidate pilot signals, a traffic channel corresponding to a candidate pilot signal is established between the mobile station and the corresponding base station as a new mobile station active leg. In a CDMA system which allows three-way (maximum of three legs) handoff and the PSMM includes three existing mobile station active legs in addition to candidate pilot signals, the leg corresponding to a candidate pilot signal will be made active in place of a weakest existing mobile station active leg only if the pilot signal strength of the candidate pilot signal is greater than the pilot signal strength of the weakest active leg by at least a value of T_comp, which typically may be 3 dB.

Excessive handoffs such as ten or more per call may occur in a conventional mobile communication system as the mobile station moves within a fading environment. Even though a handoff may be preferred in the reverse link from the mobile station to the base station to maintain RF performance, excessive handoffs have negative impact on forward link power and network processing resources. Thus, there is a need to reduce excessive handoffs.

SUMMARY OF THE INVENTION

The present invention reduces the number of handoffs per call without impacting RF performance so that forward link power and network resources may be conserved. The base station screens candidate pilot signals from the PSMM generated by the mobile station and sends a revised PSMM to the mobile switching center. The mobile switching center controls handoffs based on the revised PSMM such that the number of handoffs may be reduced. In an alternative embodiment, the PSMM may be revised at the mobile switching center.

DETAILED DESCRIPTION OF PREFERRED EMBODIMENTS

Figure 1:
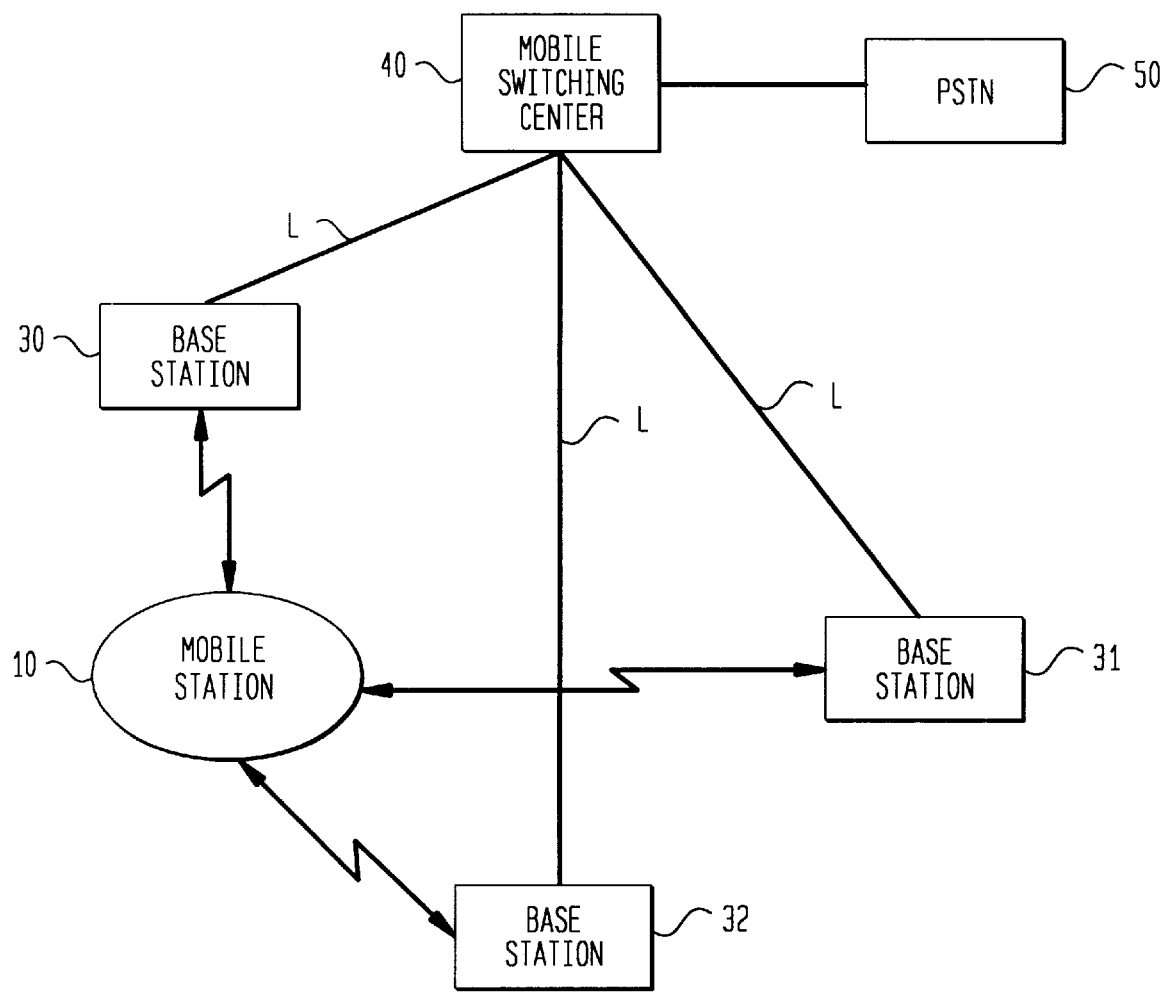
FIG. 1 illustrates a mobile communication system of a preferred embodiment of the present application.

FIG. 1 illustrates a mobile communication system which utilizes the CDMA base station assisted soft handoff (BAHO) algorithm of a preferred embodiment of the present application. As illustrated in FIG. 1, the mobile communication system includes a plurality of base stations 30, 31 and 32 which transmit and receive communication signals to/from mobile station 10. Although not illustrated, each of base stations may cover respective sectors. Mobile switching center 40 is coupled to the plurality of base stations 30–32 via communication lines L and is further coupled to public switched telephone network (PSTN) 50 to enable communication between mobile station 10 and another party on PSTN 50. Although three respective base stations are illustrated, it is to be understood that the mobile communication system may include any number of base stations.

Figure 2:
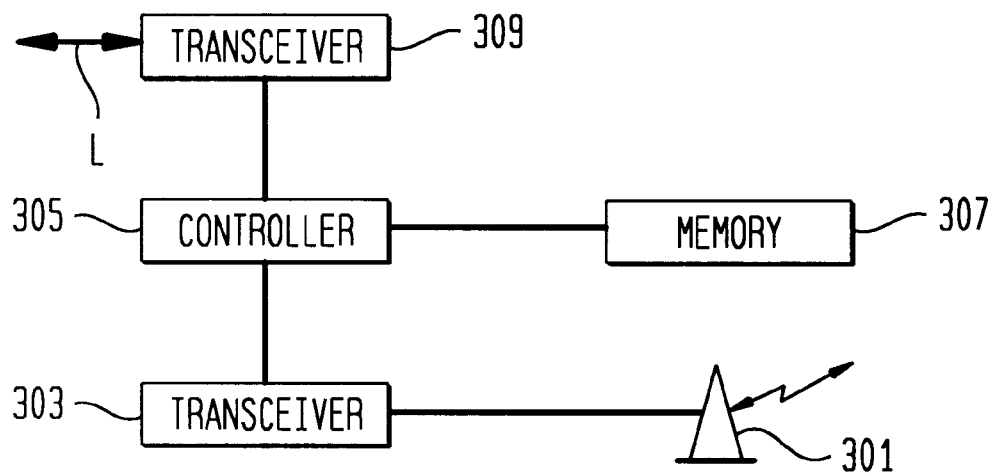
FIG. 2 illustrates base station 30 of FIG. 1 in greater detail.

FIG. 2 illustrates base station 30 in greater detail. Transceiver 303 transmits and receives RF signals to/from mobile station 10 via antenna 301. Transceiver 303 and antenna 301 may be any conventional transceiver and antenna and may function in a conventional duplexing mode to enable transmission and reception of the RF signals. In the alternative, transceiver 303 may be replaced with a separate transmitter and receiver pair and antenna 301 may include a transmission antenna and a reception antenna. Transceiver 303 demodulates and filters RF signals received from mobile station 10 via antenna 301 and provides the corresponding demodulated receive signal to controller 305. Transceiver 303 also modulates and amplifies a transmission signal provided from controller 305 and provides the modulated transmission signal to antenna 301 for transmission as an RF signal to mobile station 10.

Base station 30 further includes transceiver 309 which transmits and receives signals to/from mobile switching center 40 via communication lines L. Transceiver 309 may be any conventional transceiver as would be known by one of ordinary skill. In an alternative embodiment, transceiver 309 may comprise a transmitter and receiver pair for transmitting and receiving signals to/from message switching center 40 over a pair of communication lines L.

Operation of base station 30 is controlled by controller 305 in a manner which will be subsequently described. Controller 305 may be a microprocessor which controls operation of base station 30 in accordance with software programming stored in memory 307. As would be readily understood by one of ordinary skill, controller 305 may in the alternative comprise various discrete hardware circuit elements and should not necessarily be limited as microprocessor-based. In addition to storing operating programs for base station 30, memory 307 also includes working memory which may be used by controller 305.

Figure 3:
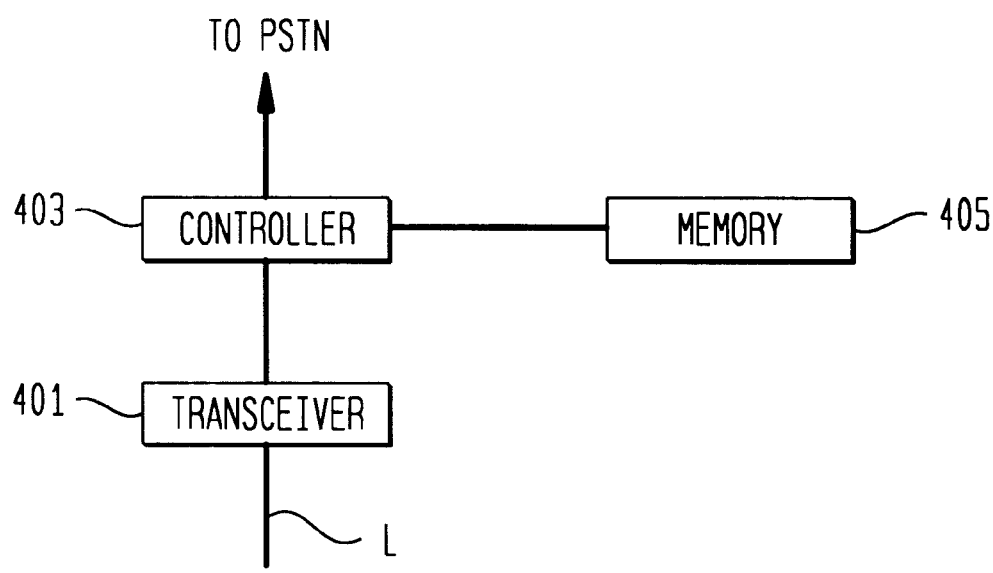
FIG. 3 illustrates message switching center 40 of FIG. 1 in greater detail.

FIG. 3 illustrates mobile switching center 40 in greater detail. Transceiver 401 is coupled to communication lines L to receive and transmit signals from/to the base stations 30–32. Transceiver 401 may be any conventional transceiver usable in a mobile switching center as would be understood by one of ordinary skill. In an alternative embodiment, transceiver 401 may comprise a transmitter and receiver pair for transmitting and receiving signals separately over a pair of communication lines L. The operation of mobile switching center 40 is controlled by controller 403 as will be described subsequently in greater detail. Controller 403 may be microprocessor-based and may function to control operation of mobile switching center 40 in accordance with software programming stored within memory 405. Memory 405 may also include working memory area usable by controller 403. Controller 403 is also coupled to PSTN 50.

The base station assisted soft handoff (BAHO) of a preferred embodiment of the present application will now be described with respect to the flowchart of FIG. 4. In this particular embodiment, any of base stations 30, 31 and 32 as illustrated in FIG. 1 screen or filter the content of the PSMM generated and provided by mobile station 10. Screening of the PSMM by the base station is performed by controller 305 in accordance with software programming stored within memory 307. The PSMM is derived from an RF signal received by transceiver 303 via antenna 301 from mobile station 10. Transceiver 303 demodulates the corresponding received RF signal and provides the PSMM to controller 305. Controller 305 maintains a copy of the PSMM and also copies the PSMM in the working space of memory 307. Controller 305 subsequently conducts the screening process on the received PSMM in accordance with the flowchart illustrated in FIG. 4 making reference to the PSMM copied in the working space of memory 307.

Controller 305 first determines in step 601 the combined pilot signal strength of existing mobile station active legs of mobile station 10 based on the received PSMM. The combined pilot signal strength is denoted as (Ec/Io)c and corresponds to the sum of all the pilot signal strengths of the existing mobile station active legs divided by the total received power at mobile station 10, which may be determined by any known conventional method as would be well within the level of ordinary skill. The total received power at mobile station 10 includes the power of all received pilot signals, all active traffic channels and interference. Upon determination of (Ec/Io)c in step 601 of FIG. 4, processing proceeds to step 603.

In step 603, controller 305 determines if the combined pilot signal strength (Ec/Io)c is less than predetermined threshold T_quality. In this embodiment, the predetermined threshold T_quality is set to −8 dB. The value of T_quality is selected to provide a reference for RF quality of the combined pilot signal strength (Ec/Io)c. In other words, if the combined pilot signal strength (Ec/Io)c is determined as greater than T quality, the combined pilot signal strength of the existing mobile station active legs would be considered strong and handoff to a new mobile station active leg would at best provide only minor improvement of RF performance, at the expense of consuming forward link capacity and network processing resources. In such a case, the corresponding candidate pilot signal should not be added or swapped to become a mobile station active leg by mobile switching center 40. On the other hand, if the combined pilot signal strength (Ec/Io)c is less than T quality, the combined pilot signal strength of the existing mobile station active legs may be considered as relatively weak. The candidate pilot signals should thus be maintained on the PSMM since eventual handoff to traffic channels corresponding to the candidate pilot signals may positively contribute to RF performance.

The value of T_quality in this embodiment has been selected in view of the desire that the 90% percentile of the frame error rate (FER) would be approximately 4%. As such, the 50% percentile of the combined pilot signal strength (Ec/Io)c should necessarily be maintained to be above −8 dB. When the combined pilot signal strength (Ec/Io)c exceeds the −8 dB threshold, improved RF performance is guaranteed. As noted above, the particular value of T_quality should not be limited as 8 dB but may be varied depending upon the particular mobile station equipment used and other relevant factors.

Upon determination by controller 305 in step 603 that the combined pilot signal strength (Ec/Io)c is less than T_quality, controller 305 in step 605 maintains the current received PSMM as including the pilot signal of the existing mobile station active leg and the candidate pilot signals. Thereafter, screening of the PSMM is terminated. On the other hand, upon determination by controller 305 in step 603 that the combined pilot signal strength (Ec/Io)c is greater than or equal to T_quality, the received PSMM as maintained by controller 305 is revised in step 607 by controller 305 such that the candidate pilots are deleted from the PSMM since handoff to a traffic channel corresponding to the candidate pilot signals would in all likelihood not result in improvement of RF performance.

In step 609, controller 305 refers to the PSMM originally copied in the working space of memory 307 and determines if the pilot signal strength (Ec/Io)new of a candidate pilot signal of the PSMM provided by mobile station 10 is greater than predetermined threshold T_accept. In this embodiment, the value of T_accept is selected as −9 dB. A candidate pilot signal having pilot signal strength (Ec/Io) new greater than −9 dB, or T_add+T_comp, can be considered as a relatively strong candidate pilot signal. The traffic channel corresponding to such a candidate pilot signal would in all likelihood contribute to improvement of RF performance, even if the combined pilot signal strength (Ec/Io)c as determined in step 601 is greater than or equal to predetermined threshold T_quality.

Upon determination by controller 305 in step 609 that the pilot signal strength (Ec/Io)new of a candidate pilot signal of the PSMM originally copied in the working space of memory 307 is greater than T_accept, the PSMM maintained by controller 305 is revised in step 611 by controller 305 such that the candidate pilot signal is added to the PSMM. The revised PSMM would thus include pilot signals of existing mobile station active legs and candidate pilot signals having pilot signal strength greater than T_accept. It is to be understood that the pilot signal strength of all candidate pilot signals of the PSMM originally copied in the working space of memory 307 are compared to T_accept in step 609 and the PSMM maintained by controller 305 is revised in step 611 to include candidate pilot signals as may be appropriate. Upon determination in step 609 that the pilot signal strength (Ec/Io)new of a candidate pilot signal is not greater than T_accept, processing proceeds directly to step 613.

In step 613, controller 305 again refers to the original PSMM copied in the working space of memory 307 and determines if the pilot signal strength (Ec/Io)new of a candidate pilot signal is greater than the pilot signal strength (Ec/Io) of the strongest pilot signal of the existing mobile station active legs. Upon determination that the pilot signal strength (Ec/Io)new of a candidate pilot signal is greater than the pilot signal strength (Ec/Io) of the strongest pilot signal of the set of active pilots, the PSMM maintained by controller 305 is revised in step 615 such that the candidate pilot signal is added to the PSMM by controller 305 and processing is thereafter terminated.

On the other hand, upon determination by controller 305 in step 613 that the pilot signal strength (Ec/Io)new of a candidate pilot signal of the original PSMM copied in memory 307 is not greater than the pilot signal strength (Ec/Io) of the strongest pilot of the set of active pilots, processing is terminated. It is to be understood that all pilot signal strengths of the candidate pilot signals of the PSMM originally copied in the working space of memory 307 are compared in step 613 and controller 305 subsequently revises the maintained PSMM in step 615 as may be necessary. Upon termination of screening of the PSMM provided from mobile station 10 in accordance with the flowchart of FIG. 4, controller 305 sends the revised PSMM to mobile switching center 40 via transceiver 309 and communication lines L wherein conventional handoff procedures are subsequently performed in accordance with the revised PSMM.

Accordingly, the base stations screen or filter out candidate pilot signals from the PSMM generated by mobile station 10 such that a revised PSMM is generated which does not include candidate pilot signals which are not particularly strong. As should be understood, traffic channels corresponding to candidate pilot signals screened or filtered out in all likelihood would not contribute to improved RF performance. Since these candidate pilot signals are not included in the revised PSMM sent to mobile switching center 40, handoffs to the traffic channels corresponding to these relatively weaker candidate pilot signals are prevented. Handoffs under control of mobile switching center 40 thus will be made only to traffic channels which will likely improve RF quality. Excessive handoffs to traffic channels which will not likely improve RF performance will be avoided such that the number of handoffs in general will be reduced, thus conserving forward link power and network processing resources.

Figure 4:
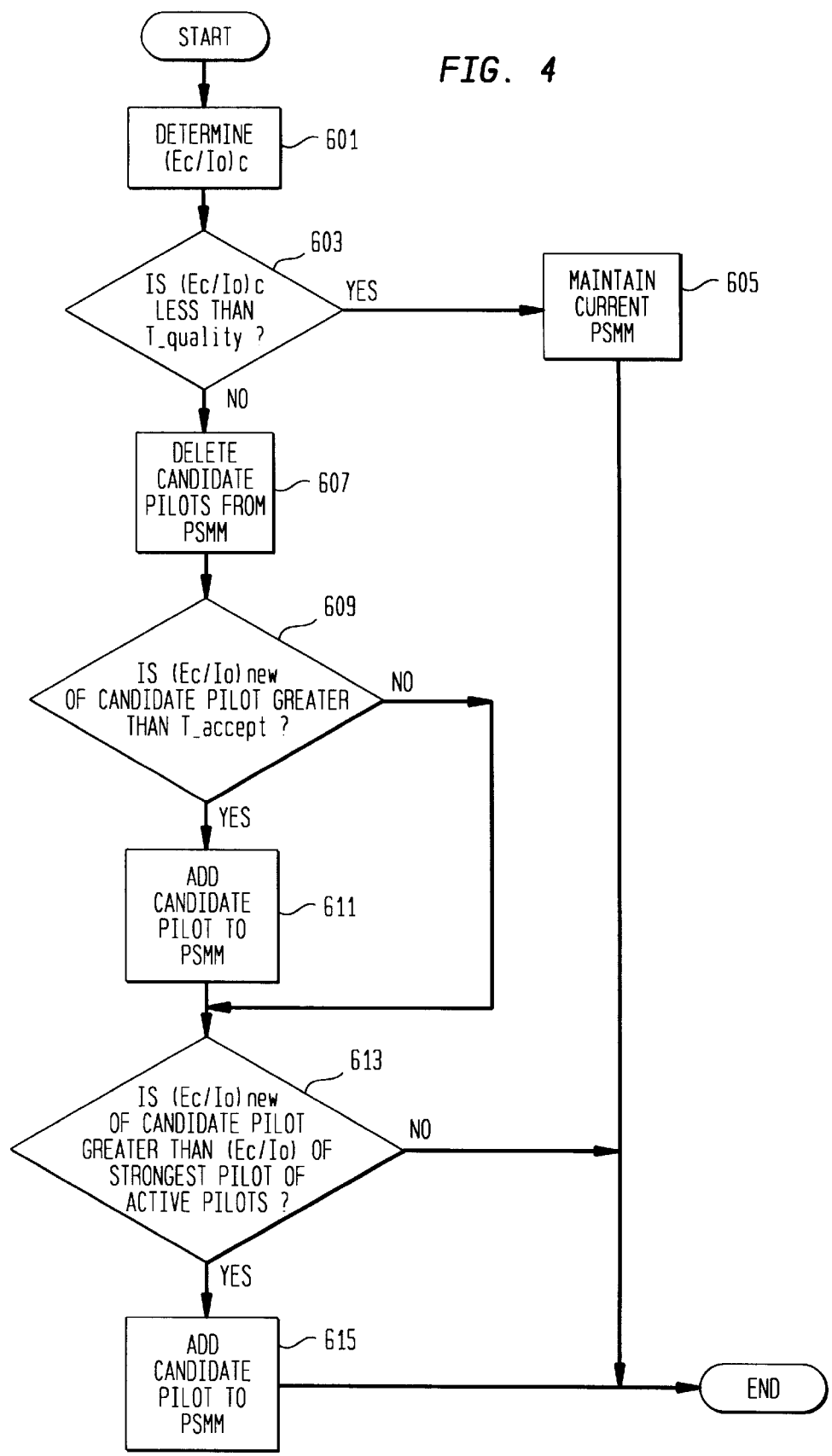
FIG. 4 illustrates a flowchart of a base station assisted soft handoff of a preferred embodiment of the present application.

In a further preferred embodiment, screening of the PSMM generated by mobile station 10 may be carried out in accordance with the flowchart of FIG. 4 such that a revised PSMM is generated in mobile switching center 40 rather than in any of base stations 3–32. In this embodiment, the PSMM generated by mobile station 10 transmitted to a base station is directly sent to mobile switching center 40 without revision. Controller 403 of mobile switching center 40 then revises the PSMM in accordance with software programming stored within memory 405 as described in accordance with the flowchart of FIG. 4. Upon revision of the PSMM, controller 403 subsequently conducts conventional handoff procedures based on the revised PSMM.

The base station assisted soft handoff (BAHO) of a further preferred embodiment of the present application will now be described with respect to the flowchart of FIG. 5. In this further preferred embodiment, any of base stations 30, 31 and 32 as illustrated in FIG. 1 screen or filter the content of the PSMM generated and provided by mobile station 10 in accordance with software programming stored within memory 307. In this embodiment, controller 305 maintains the received PSMM and the screening process is carried out on the received PSMM. Copying of the PSMM in memory 37 is not necessary in this embodiment.

Figure 5:
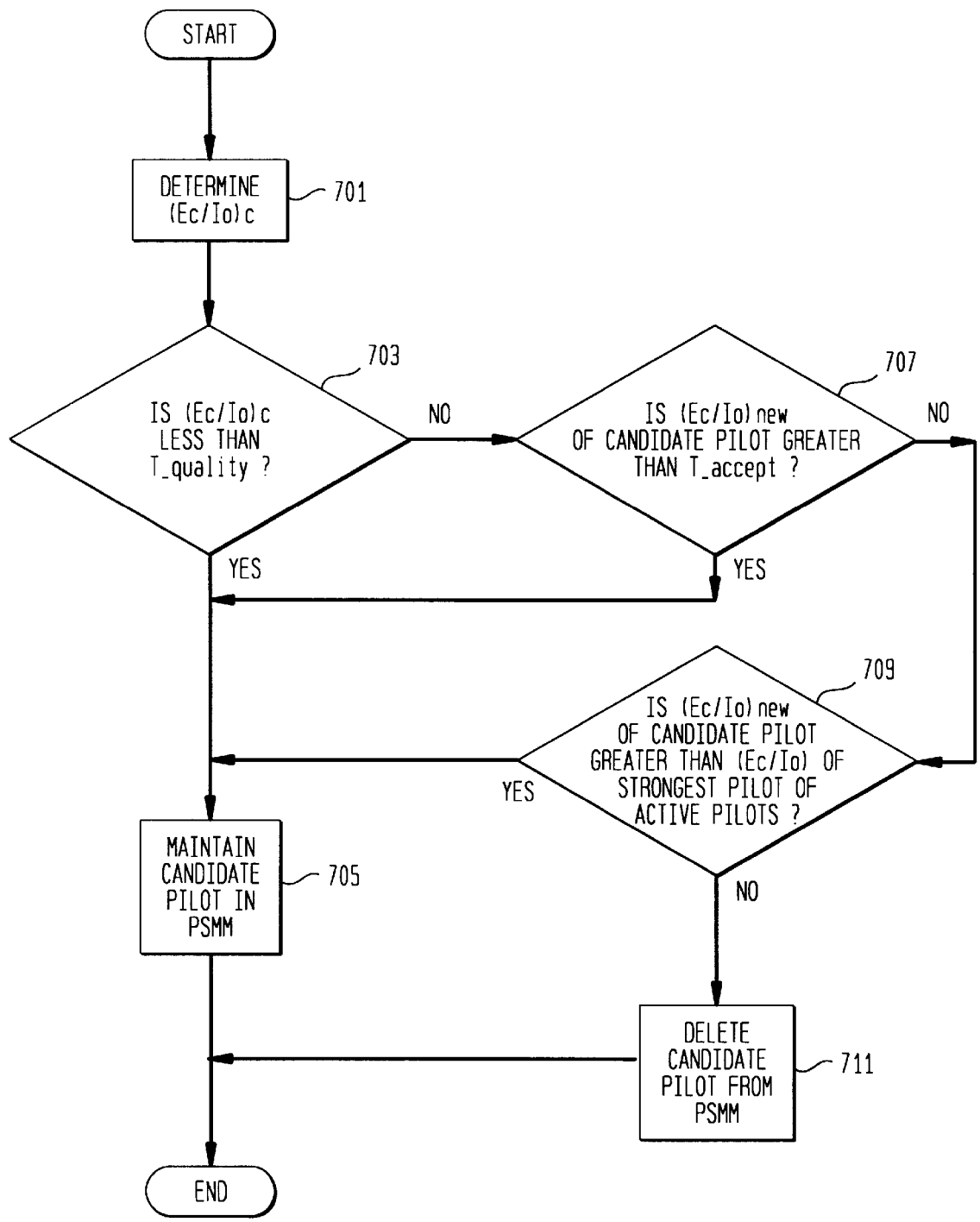
FIG. 5 illustrates a flowchart of a base station assisted soft handoff of a further preferred embodiment of the present application.

With reference to FIG. 5, controller 305 first determines in step 701 the combined pilot signal strength of existing mobile station active legs of mobile station 10 based on the received PSMM. In step 703, controller 305 determines if the combined pilot signal strength (Ec/Io)c is less than predetermined threshold T_quality. Upon determination by controller 305 in step 703 that the combined pilot signal strength (Ec/Io)c is less than T_quality, controller 305 in step 705 maintains the candidate pilot signals and the pilot signal of the existing mobile station active leg in the received PSMM.

Upon determination by controller 305 in step 703 that the combined pilot signal strength (Ec/Io)c is not less than T_quality, it is determined in step 707 if the pilot signal strength (Ec/Io)new of a candidate pilot signal of the PSMM provided by mobile station 10 is greater than predetermined threshold T_accept. A candidate pilot signal having pilot signal strength (Ec/Io)new greater than T_accept can be considered as a relatively strong candidate pilot signal and would thus in all likelihood contribute to improvement of RF performance. Upon determination by controller 305 in step 707 that the pilot signal strength (Ec/Io)new of the candidate pilot signal of the received PSMM is greater than T_accept, the corresponding candidate pilot signal is maintained in the PSMM in step 705. Upon determination by controller 305 in step 707 that the pilot signal strength (Ec/Io)new of the candidate pilot signal of the PSMM is not greater than T_accept, processing proceeds to step 709.

In step 709, controller 305 determines if the pilot signal strength (Ec/Io)new of the candidate pilot signal is greater than the pilot signal strength (Ec/Io) of the strongest pilot signal of the existing mobile station active legs. Upon determination that the pilot signal strength (Ec/Io)new of the candidate pilot signal is greater than the pilot signal strength (Ec/Io) of the strongest pilot signal of the set of active pilots, the candidate pilot signal is maintained in the PSMM by controller 305 in step 705. Upon determination by controller 305 in step 709 that the pilot signal strength (Ec/Io)new of the candidate pilot signal of the PSMM is not greater than the pilot signal strength (Ec/Io) of the strongest pilot of the set of active pilots, the candidate pilot signal is deleted from the PSMM in step 711.

It is to be understood that the pilot signal strength of each candidate pilot signal is compared to T accept in step 707 and a candidate pilot signal is then either maintained in the PSMM in step 705 or the pilot signal strength of the candidate pilot signal is compared to the pilot signal strength of the strongest pilot signal of the set of active pilots in step 709. Upon termination of screening of the PSMM provided from mobile station 10 in accordance with the flowchart of FIG. 5, controller 305 sends the revised PSMM to mobile switching center 40 wherein conventional handoff procedures are subsequently performed in accordance with the revised PSMM.

In a still further preferred embodiment, screening of the PSMM generated by mobile station 10 may be carried out in accordance with the flowchart of FIG. 5 such that the revised PSMM is generated in mobile switching center 40 rather than in any of base stations 30–32. The PSMM generated by mobile station 10 transmitted to a base station is sent to mobile switching center 40 by the base station without revision and controller 403 of mobile switching center 40 revises the PSMM in accordance with software programming stored within memory 405 as described in accordance with the flowchart of FIG. 5. Upon revision of the PSMM, controller 403 subsequently conducts conventional handoff procedures based on the revised PSMM.

The base station assisted soft handoff (BAHO) of a further preferred embodiment of the present application will now be described with respect to the flowchart of FIG. 6. In this embodiment, any of base stations 30, 31 and 32 as illustrated in FIG. 1 screen or filter the content of the PSMM generated and provided by mobile station 10 in accordance with software programming stored within memory 307 of the base station. Upon receipt of the PSMM from mobile station 10, controller 305 copies the PSMM in the working space of memory 307 and generates a revised PSMM in accordance with the flowchart illustrated in FIG. 6 making reference to the PSMM copied in the working space of memory 307.

Figure 6:
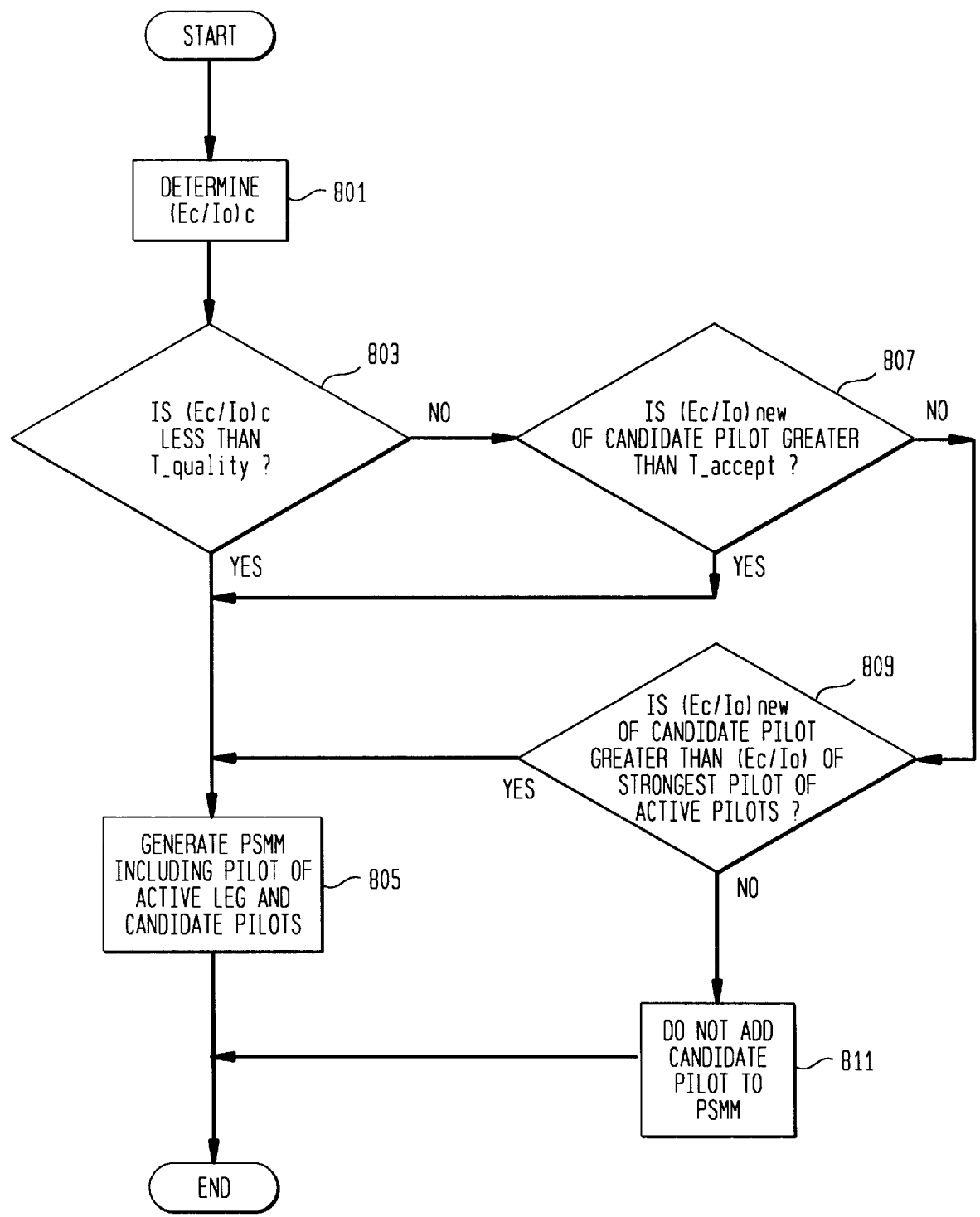
FIG. 6 illustrates a flowchart of a base station assisted soft handoff of a still further preferred embodiment of the present application.

With reference to FIG. 6, controller 305 first determines in step 801 the combined pilot signal strength (Ec/Io)c of existing mobile station active legs of mobile station 10 based on the copied PSMM. In step 803, controller 305 determines if the combined pilot signal strength (Ec/Io)c is less than predetermined threshold T_quality. Upon determination by controller 305 in step 803 that the combined pilot signal strength (Ec/Io)c is less than T_quality, controller 305 in step 805 generates a revised PSMM as including the pilot signals of the existing mobile station active legs and adds the candidate pilots to the revised PSMM. On the other hand, upon determination by controller 305 in step 803 that the combined pilot signal strength (Ec/Io)c is greater than or equal to T_quality, processing proceeds to step 807.

In step 807, controller 305 makes reference to the PSMM originally copied in the working space of memory 307 and determines if the pilot signal strength (Ec/Io)new of a candidate pilot signal of the PSMM provided by mobile station 10 is greater than predetermined threshold T_accept. Upon determination by controller 305 in step 807 that the pilot signal strength (Ec/Io)new of the candidate pilot signal of the copied PSMM is greater than T_accept in step 807, controller 305 generates a revised PSMM including the pilot signals of the existing mobile station active legs and adds the candidate pilot signal to the revised PSMM. Upon determination by controller 305 in step 807 that the pilot signal strength (Ec/Io)new of the candidate pilot signal of the copied PSMM is not greater than T_accept, processing proceeds to step 809.

In step 809, controller 305 determines if the pilot signal strength (Ec/Io)new of the candidate pilot signal is greater than the pilot signal strength (Ec/Io) of the strongest pilot signal of the existing mobile station active legs. Upon determination that the pilot signal strength (Ec/Io)new of the candidate pilot signal is greater than the pilot signal strength (Ec/Io) of the strongest pilot signal of the set of active pilots, controller 305 generates the revised PSMM as including the pilot signals of the existing mobile station active legs, candidate pilot signals added as a result of comparison in step 807 and the candidate pilot signal having pilot signal strength greater than the strongest pilot signal of the set of active pilots. Upon determination that the pilot signal strength (Ec/Io)new of the candidate pilot signal is not greater than the pilot signal strength (Ec/Io) of the strongest pilot signal of the set of active pilot signals, processing proceeds to step 811 and the candidate pilot signal is not added to the revised PSMM.

It is to be understood that the pilot signal strength of each candidate pilot signal of the PSMM is compared to T_accept in step 807 and a candidate pilot signal is then either added to the revised PSMM in step 805 or the pilot signal strength of the candidate pilot signal is compared to the pilot signal strength of the strongest pilot signal of the set of active pilots in step 809. Upon termination of screening of the PSMM provided from mobile station 10 in accordance with the flowchart of FIG. 6, controller 305 sends the generated PSMM to mobile switching center 40 wherein conventional handoff procedures are subsequently performed in accordance with the generated PSMM.

In a still further preferred embodiment, screening of the PSMM generated by mobile station may be carried out in accordance with the flowchart of FIG. 6 such that the revised PSMM is generated in mobile switching center 40 rather than in any of base stations 30–32. The PSMM generated by mobile station 10 transmitted to the base station is sent to mobile switching center 40 without revision and controller 403 of mobile switching center 40 generates the revised PSMM in accordance with software programming stored within memory 405 as described in accordance with the flowchart of FIG. 6. Controller 403 subsequently conducts conventional handoff procedures based on the revised PSMM.

It is to be understood that the programming necessary for carrying out processing described in accordance with the flow charts of FIGS. 4–6 is not to be limited as stored within memories 307 and 405 of base station 30 and mobile switching center 40 of FIGS. 2 and 3 respectively. The programming may be recorded on a computer readable medium such as a floppy disc or CD ROM readable by controllers 305 and 403 of base station 30 and mobile switching center 40, respectively.

It is also to be understood that the CDMA base station assisted soft handoff of the present invention should not necessarily be limited in view of the corresponding figures and description. For instance, although controller 305 of base station 30 and controller 403 of mobile switching center 40 are described as microprocessor-based which function in accordance with software programming respectively stored in memories 307 and 405, controllers 305 and 403 may be discrete circuit elements including a comparator, a circuit which measures pilot signal strength and a circuit which modifies the pilot signal measurement message. Furthermore, controllers 305 and 403 may have memories incorporated therein such that memories 307 and 405 of FIGS. 2 and 3 are not necessary. In a further preferred embodiment, screening of the PSMM to provide a revised PSMM as in the flowchart of FIG. 4 may be carried out without including steps 613 and 615. Moreover, the values of the T_add, T quality and T_accept as described above are given by way of illustration and should not be considered as limiting. Also, the base station assisted soft handoff should not necessarily be limited to CDMA systems but may be applicable to any mobile communication system as may be appropriate.

What is claimed is:

1. A method of screening pilot signals of a pilot strength measurement message generated by a mobile station, the pilot strength measurement message identifying a pilot signal and pilot signal strength of at least one active leg of the mobile station and identifying at least one candidate pilot signal and pilot signal strength of the at least one candidate pilot signal, comprising the steps of:
   a) determining the combined pilot signal strength of the pilot signals of the active legs;
   b) comparing the combined pilot signal strength determined in said step a) to a first threshold; and
   c) providing a revised pilot strength measurement message which does not include the candidate pilot signals upon determination in said step b) that the combined pilot signal strength is greater than the first threshold.

2. The method of screening pilot signals of claim 1, further comprising the steps of:
   d) comparing the pilot signal strength of a candidate pilot signal to a second threshold; and
   e) providing a revised pilot strength measurement message including the candidate pilot signal upon determination in said step d) that the pilot signal strength of the candidate pilot signal is greater than the second threshold.

3. The method of screening pilot signals of claim 2, further comprising the steps of:
   f) comparing the pilot signal strength of a candidate pilot signal to the pilot signal strength of a strongest pilot signal of the active legs; and
   g) providing a revised pilot strength measurement message including the candidate pilot signal upon determination in said step f) that the pilot signal strength of the candidate pilot signal is greater than the pilot signal strength of the strongest pilot signal of the active legs.

4. The method of screening pilot signals of claim 1, further comprising the step of:
   d) providing a revised pilot strength measurement message including the candidate pilot signals upon determination in said step b) that the combined pilot signal strength is less than the first threshold.

5. The method of screening pilot signals of claim 1, wherein the pilot strength measurement message is transmitted from the mobile station to a base station and provided from the base station to a mobile switching center and screening of the pilot strength measurement message is carried out at the mobile switching center.

6. The method of screening pilot signals of claim 1, wherein the active legs of the mobile station are code division multiple access legs.

7. The method of screening pilot signals of claim 1, wherein the pilot strength measurement message is transmitted from the mobile station to a base station and screening of the pilot strength measurement message is carried out at the base station.

8. A base station of a mobile communication system, the base station receiving a pilot strength measurement message generated by a mobile station, the pilot strength measurement message identifying a pilot signal and pilot signal strength of at least one active leg of the mobile station and identifying at least one candidate pilot signal and pilot signal strength of the at least one candidate pilot signal, the base station comprising:
   a controller that revises the pilot strength measurement message,
   said controller determining the combined pilot signal strength of the pilot signals of the active legs identified in the pilot strength measurement message, comparing the combined pilot signal strength to a first threshold and providing a revised pilot strength measurement message which does not include the candidate pilot signals upon determination that the combined pilot signal strength is greater than the first threshold.

9. The base station of claim 8, wherein said controller compares the pilot signal strength of a candidate pilot signal to a second threshold and provides a revised pilot strength measurement message which includes the candidate pilot signal upon determination that the pilot signal strength of the candidate pilot signal is greater than the second threshold.

10. The base station of claim 9, wherein said controller compares the pilot signal strength of a candidate pilot signal to the pilot signal strength of a strongest pilot signal of the active legs and provides a revised pilot strength measurement message which includes the candidate pilot signal upon determination that the pilot signal strength of the candidate pilot signal is greater than the pilot signal strength of the strongest pilot signal of the active legs.

11. The base station of claim 8, wherein said controller provides a revised pilot strength measurement message including the candidate pilot signals upon determination that the combined pilot signal strength is less than the first threshold.

12. The base station of claim 8, further comprising a transmitter that transmits the revised pilot strength measurement message to a mobile switching center of the mobile communication system.

13. The base station of claim 8, wherein the active legs of the mobile station are code division multiple access legs.

14. A mobile switching center of a mobile communication system, the mobile switching center receiving a pilot strength measurement message generated by a mobile station, the pilot strength measurement message identifying a pilot signal and pilot signal strength of at least one active leg of the mobile station and identifying at least one candidate pilot signal and pilot signal strength of the at least one candidate pilot signal, the mobile switching center comprising:
   a controller that revises the pilot strength measurement message,
   said controller determining the combined pilot signal strength of the pilot signals of the active legs identified in the pilot strength measurement message, comparing the combined pilot signal strength to a first threshold and providing a revised pilot strength measurement message which does not include the candidate pilot signals upon determination that the combined pilot signal strength is greater than the first threshold.

15. The mobile switching center of claim 14, wherein said controller compares the pilot signal strength of a candidate pilot signal to a second threshold and provides a revised pilot strength measurement message including the candidate pilot signal upon determination that the pilot signal strength of the candidate pilot signal is greater than the second threshold.

16. The mobile switching center of claim 15, wherein said controller compares the pilot signal strength of a candidate pilot signal to the pilot signal strength of a strongest pilot signal of the active legs and provides a revised pilot strength measurement message including the candidate pilot signal upon determination that the pilot signal strength of the candidate pilot signal is greater than the pilot signal strength of the strongest pilot signal of the active legs.

17. The mobile switching center of claim 14, wherein said controller provides a revised pilot strength measurement message including the candidate pilot signals upon determination that the combined pilot signal strength is less than the first threshold.

18. The mobile switching center of claim 14, wherein the pilot strength measurement message is provided from the mobile station to a base station, the mobile switching center further comprising:

a receiver that receives the pilot strength measurement message transmitted from the base station.

19. The mobile switching center of claim 14, wherein the active legs of the mobile station are code division multiple access legs.

20. A base station of a mobile communication system comprising:

receiving means for receiving a pilot strength measurement message generated by a mobile station of the mobile communication system, the pilot strength measurement message identifying a pilot signal and pilot signal strength of at least one active leg of the mobile station and identifying at least one candidate pilot signal and pilot signal strength of the at least one candidate pilot signal;

determination means for determining the combined pilot signal strength of the pilot signals of the active legs;

comparison means, coupled to said determination means, for comparing the combined pilot signal strength of the pilot signals of the active legs to a first threshold; and modifying means, coupled to said comparison means, for providing a revised pilot strength measurement message which does not include the candidate pilot signals upon determination by said comparison means that the combined pilot signal strength is greater than the first threshold.

21. The base station of claim 20, said comparison means also comparing the pilot signal strength of a candidate pilot signal to a second threshold, said modifying means providing a revised pilot strength measurement message as including the candidate pilot signal upon determination by said comparison means that the pilot signal strength of the candidate pilot signal is greater than the second threshold.

22. The base station of claim 21, said comparison means also comparing the pilot signal strength of a candidate pilot signal to the pilot signal strength of a strongest pilot signal of the active legs, said modifying means providing a revised pilot strength measurement message as including the candidate pilot signal upon determination that the pilot signal strength of the candidate pilot signal is greater than the pilot signal strength of the strongest pilot of the active legs.

23. The base station of claim 20, said modifying means providing a revised pilot strength measurement message as including the candidate pilot signals upon determination by said comparison means that the combined pilot signal strength is less than the first threshold.

24. The base station of claim 20, wherein the active legs of the mobile station are code division multiple access legs.

25. The base station of claim 20, further comprising transmitter means for transmitting the revised pilot strength measurement message to a mobile switching center of the mobile communication system.

26. An article of manufacture taking the form of a computer-readable medium for screening pilot signals of a pilot strength measurement message generated by a mobile station, the pilot strength measurement message identifying a pilot signal and pilot signal strength of at least one active leg of the mobile station and identifying at least one candidate pilot signal and pilot signal strength of the at least one candidate pilot signal, the article of manufacture comprising:

a determination source code segment for causing a computer to determine the combined pilot signal strength of the pilot signals of the active legs;

a first comparison source code segment for causing the computer to compare the combined pilot signal strength to a first threshold; and a first modifying source code segment for causing the computer to provide a revised pilot strength measurement message which does not include the candidate pilot signals when the combined pilot signal strength is greater than the first threshold.

27. The article of manufacture of claim 26, further comprising:

a second comparison source code segment for causing the computer to compare a candidate pilot signal to a second threshold; and a second modifying source code segment for causing the computer to provide a revised pilot strength measurement message as including the candidate pilot signal when the pilot signal strength of the candidate pilot signal is greater than the second threshold.

28. The article of manufacture of claim 27, further comprising:

a third comparison source code segment for causing the computer to compare the pilot signal strength of a candidate pilot signal to the pilot signal strength of a strongest pilot signal of the active legs; and a third modifying source code segment for causing the computer to provide a revised pilot strength measurement message including the candidate pilot signal when the pilot signal strength of the candidate pilot signal is greater than the pilot signal strength of the strongest pilot signal of the active legs.

29. The article of manufacture of claim 28, further comprising:

a fourth modifying source code segment for causing the computer to provide a revised pilot strength measurement message which does not include the candidate pilot signal when the pilot signal strength of the candidate pilot signal is not greater than the pilot signal strength of the strongest pilot signal of the active legs.

* * * * *